United States Patent [19]
Goode et al.

[11] Patent Number: 5,312,134
[45] Date of Patent: May 17, 1994

[54] SKI GLOVE/GRIP INTERLOCK SYSTEM

[76] Inventors: David P. Goode, 1997 Long Lake Shore Dr., Bloomfield Hills, Mich. 48302; Frank E. Vogel, 136 Walnut, Apt. 1, Rochester, Mich. 48307

[21] Appl. No.: 956,302

[22] Filed: Oct. 5, 1992

Related U.S. Application Data

[63] Continuation-in-part of Ser. No. 795,136, Nov. 20, 1991.

[51] Int. Cl.$^5$ .............................................. A63C 11/22
[52] U.S. Cl. ....................................... 280/822; 2/160; 2/161.1; 280/821; 403/2
[58] Field of Search ................... 280/821, 822; 2/160, 2/161 A; 294/25; 403/2; 135/72

[56] References Cited

U.S. PATENT DOCUMENTS

| | | | |
|---|---|---|---|
| 3,170,703 | 2/1965 | Marchand | 280/11.37 |
| 3,218,089 | 11/1965 | Marchand | 280/11.37 |
| 3,232,632 | 2/1966 | Lewis | 280/11.37 |
| 3,540,751 | 11/1970 | Pierce | 280/11.37 |
| 3,746,356 | 7/1973 | Shipstad | 280/11.37 |
| 4,653,121 | 3/1987 | Kassal et al. | 2/160 |
| 5,092,629 | 3/1992 | Bagneres et al. | 280/821 |
| 5,110,154 | 5/1992 | Street | 280/822 |
| 5,123,674 | 6/1992 | Bagneres et al. | 280/821 |

FOREIGN PATENT DOCUMENTS

| | | | |
|---|---|---|---|
| 2408160 | 8/1975 | Fed. Rep. of Germany | 280/822 |
| 2613580 | 10/1977 | Fed. Rep. of Germany | |
| 2378534 | 9/1978 | France | |

*Primary Examiner*—Eric Culbreth
*Attorney, Agent, or Firm*—Krass & Young

[57] ABSTRACT

A novel ski glove/grip interlock system is disclosed in which the ski pole grip is releasably attached to the glove in a manner to maintain it in proper reflexive grasping position with a preferred swing angle relative to the skier's hand. In one embodiment, a transverse lock bar is positioned immediately adjacent the intersection of the V between thumb and forefinger on the glove for pivotal connection to a clip formed on the ski pole grip. The position and tension of the lock bar on the glove can be adjusted with a series of straps. The connection between glove and ski pole grip permits pivoting of the grip and ski pole relative to the hand at a preferred swing angle while maintaining proper position of the ski pole grip relative to the glove.

11 Claims, 6 Drawing Sheets

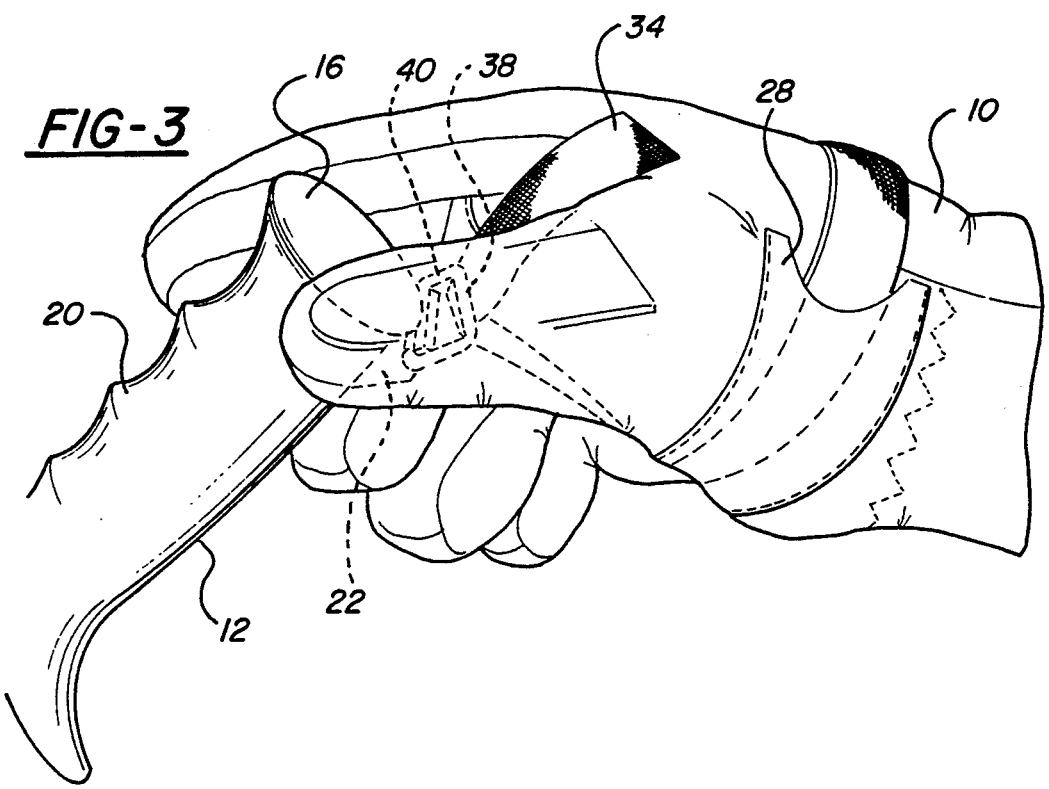
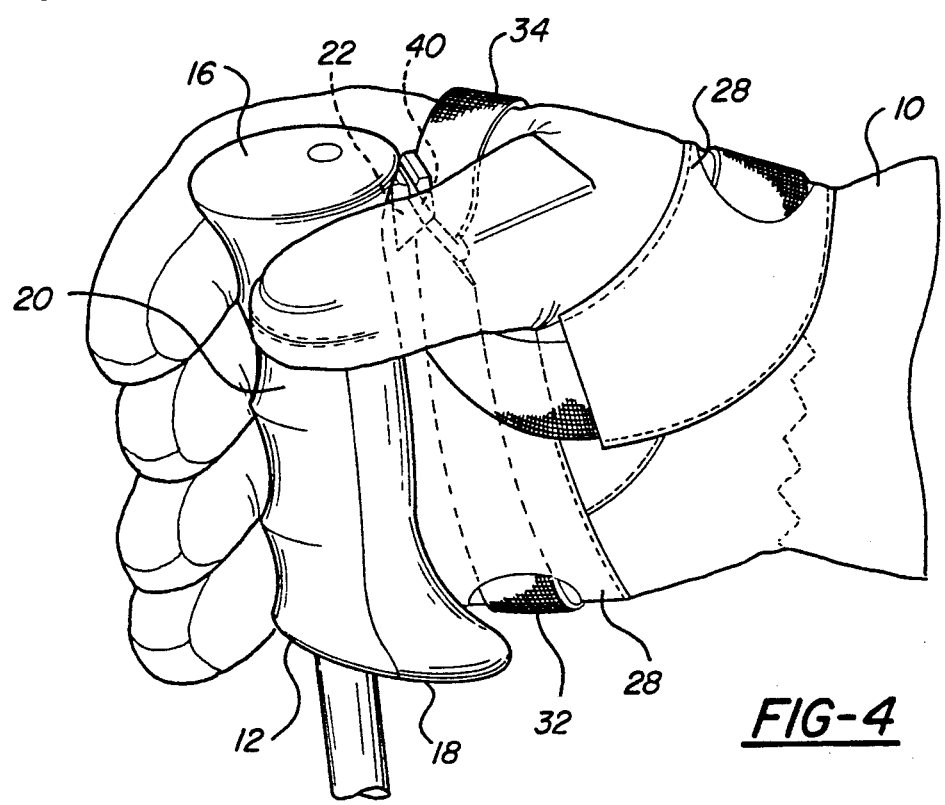

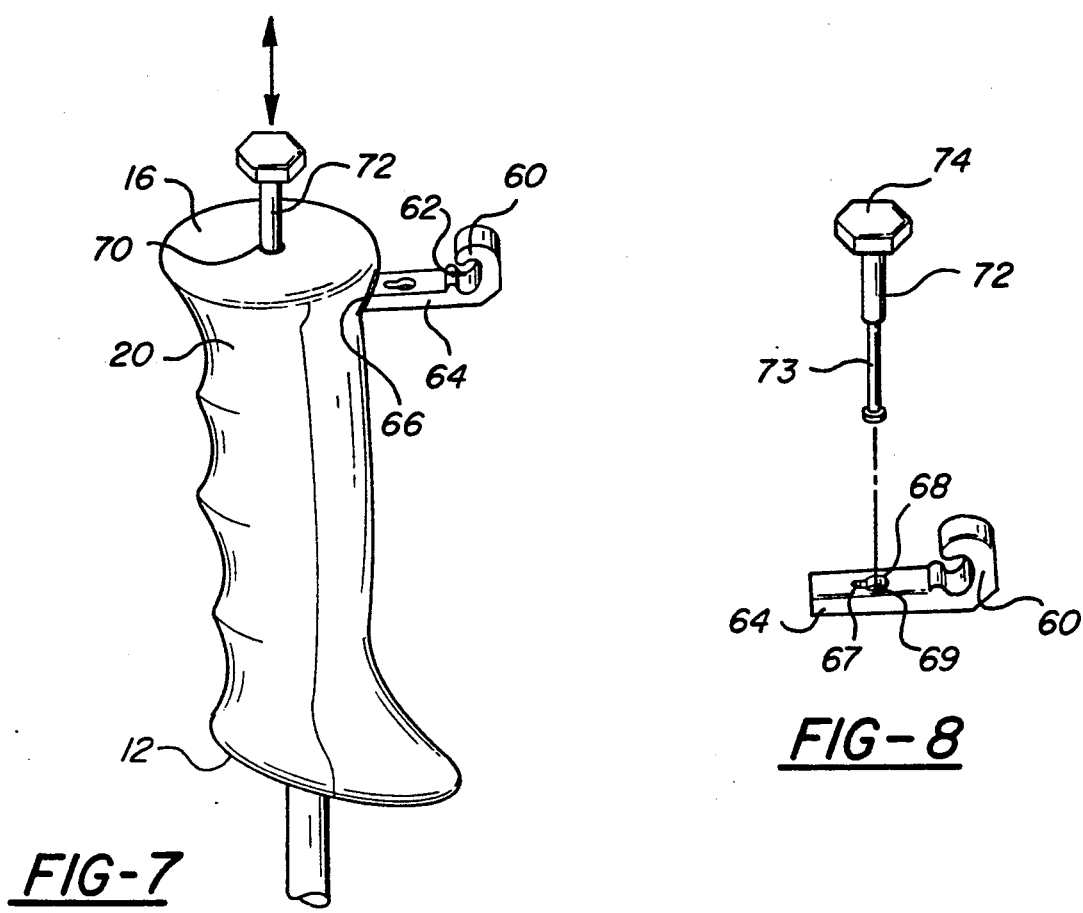
FIG-7
FIG-8
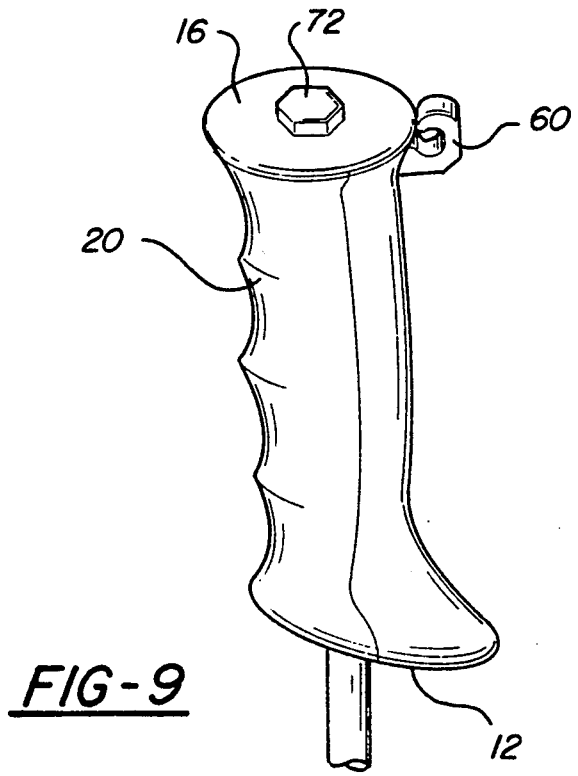
FIG-9

SKI GLOVE/GRIP INTERLOCK SYSTEM

PRIOR APPLICATION

This is a continuation-in-part of co-pending application U.S. Ser. No. 795,136, filed Nov. 20, 1991, pending.

FIELD OF THE INVENTION

The present invention is related to an interlock mechanism for providing releasable connection between a ski glove and a ski pole grip.

BACKGROUND OF THE INVENTION

Devices for providing auxiliary connection between a skier's hand or glove and the grip of a ski pole when the skier releases the grip are well-known. Their purpose has generally been to prevent inadvertent loss of the ski pole while skiing or during a fall, and to provide a convenient method for keeping the poles close at hand while the skier is adjusting equipment or otherwise performing some task with the hands during which it is impractical to maintain a grip on the poles. They also have served to some degree to enhance the skier's control of the poles while skiing.

One of the oldest and most common methods for providing such a connection has been to connect a circular strap to the ski pole grip which the skier loops over his wrist and hand. Another known device is the saber-type grip in which the grip itself is provided with a semi-rigid knuckle bow, eliminating the need for a strap.

Another approach has been to provide an interlocking connection between the ski pole grip and the ski glove itself, such that when the ski pole grip is released by the skier it remains attached directly to the glove. One such system is shown in U.S. Pat. No. 4,653,121 to Kassal et al in which a short, straight strap extends rearwardly from the top end of the ski pole grip to engage a mating strip on the top or back of the glove in a hook-and-loop connection. A disadvantage of this arrangement is that upward pressure on the pole tends to disengage the connection between the grip and the glove.

U.S. Pat. No. 3,232,632 to Lewis discloses a ski glove having a strap connected to the wrist portion of the glove and extending upwardly to a point near the tip of the thumb. The strap has an eyelet formed in the end which snaps on an anchor pin mounted on the top end of the ski pole grip to provide a connection between the glove and the pole. The position of the snap and anchor pin near the tip of the thumb and forefingers allows for a quick release using the ends of the fingers.

U.S. Pat. Nos. 3,170,703 and 3,218,089 to Marchand disclose a snap-type connector formed in a web between the thumb and forefinger for attachment to an anchor element mounted on the top end of the ski pole grip. A second snap-type connector is formed adjacent the first to permit the connection of two poles to the webbing, for example when riding a chairlift. Marchand also discloses an alternate arrangement in which the connectors are formed in a strap connected to the wrist of the glove and extending upward to a point adjacent the tip of the thumb, similar to the system in the above-described patent to Lewis.

SUMMARY OF THE INVENTION

I have found that while skiing, and particularly during competitive skiing, it is highly desirable to maintain the ski pole grip in a proper, natural grasping position with respect to the glove and hand when the grip is released by the skier. This eliminates time-consuming fumbling for the grip to reposition it once it has been released.

I have also found it desirable to provide a connection between the glove and the ski pole grip which is not disengaged, and is in fact strengthened, by upward pressure on the pole with respect to the glove.

Additionally, the teaching of the well-known "pole plant" technique has been superseded in many professional ski schools by the "pole touch", in which the pole is pivoted outwardly during the initiation phase of a turn, rather than planted forcefully into the snow. There is a preferred swing angle or pivot plane relative to the skier's hand, approximately bisecting the V between thumb and forefinger with the pivot point substantially at the intersection of the V. It is therefore important to ensure proper pivot action between the glove and the ski pole grip while maintaining the connection between them.

It is also important in a glove/grip connection system to transfer the forces encountered while skiing primarily to the wrist/palm area and the base thumb area. This allows greater comfort, pushing performance and reduced wear on the glove shell.

The above objects are equally advantageous in cross-country skiing, where the typical push-off method involves releasing the ski pole itself and applying the pushing force to the strap connecting the skier's wrist to the pole.

The above-described prior art glove/grip connecting systems are not capable of performing as I have found to be desirable. For example, they lack the strength to withstand the considerable upward shock of the pole relative to the glove. None of the prior art systems positions or maintains the ski pole grip in proper grasping position relative to the glove when the grip is released by a skier, their flexible nature and connection to the top end of the grip permitting the grip to drop well below the position in which it can easily be regrasped by the skier once released. Also, none of the prior art systems recognizes the need for a preferred swing angle and pivot point at the V of thumb and forefinger, all permitting relatively sloppy side-to-side, non-directional swaying of the pole and grip relative to the glove when the skier relaxes the grip for a "pole touch".

SUMMARY OF THE INVENTION

The present invention is an improved glove/grip interlock system which achieves the advantages listed above (resistance to upward pressure, maintaining the grip in proper grasping position, and providing the proper pivot connection) in a simple, economical manner. This is generally achieved by providing mating interlock structure on the side or gripping surface of the ski pole grip and at the point of the V between the thumb and forefinger of the glove. The interlock structure allows the grip to pivot while maintaining proper grasping position.

In one embodiment a clip is formed on the side surface of the ski pole grip to accept a lock bar mounted between the thumb and forefinger of the glove. The relative positions of the clip and the lock bar on the grip and glove maintain the ski pole grip as close as possible to the glove near the point of the V between thumb and forefinger when the grip is released. The clip is pivotally connected to the lock bar to permit the pole to freely pivot or swing while still maintaining it in the proper grasping relation to the glove.

In a further embodiment, the clip is essentially U-shaped with an upward opening channel into which the lock bar is inserted in a downward snap-fit. The lock bar is rounded to permit pivotal motion of the clip around it. The lock bar itself is connected to the glove immediately adjacent the point of the V of the thumb and forefinger, extending transversely partway therebetween. The channel in the U-shaped clip is transverse to the ski pole axis, such that the pole pivots around the lock bar in a plane essentially bisecting the V of the thumb and forefinger. The lock bar is fastened rigidly enough to the glove to ensure a preferred swing angle.

A "racing" or competition version of the interlock system includes interlock structure which mechanically locks (as opposed to a releasable snap-fit) to form an unbreakable connection between the ski pole grip and glove. Once connected, only the user can release the glove from the grip by intentionally unlocking the system. In one embodiment, a C-shaped clip is axially slidable in and out of locking position on the ski pole grip, locked in place by a vertical bayonet-type pin element.

In a further embodiment of the competition version of the interlock system, the clip is fixed to the ski pole grip while a thumb-operated slide mechanism on the top of the grip is movable between an unlocked position in which the glove side lock bar can be connected to and removed from the clip in the normal releasable snap-fit described above, and a lock position in which the thumb slide closes off the opening in the clip. In the locked position, the glove side interlock structure cannot be unintentionally released from the pole side interlock structure.

The thumb-operated slide is preferably biased by a spring or its resilient nature to the locked and unlocked positions, aided by a detent mechanism cooperating with the structure fastening the slide to the grip. Because the locking slide moves at approximately right angles to the release direction of the glove side interlock structure from the pole side interlock structure, forces tending to separate the glove side interlock structure from the pole side interlock structure when the thumb slide is in the locked position actually strengthen the locked position of the thumb slide, since such release forces are operating in the same direction as the spring bias which tends to hold the slide in one or the other of the locked and unlocked positions in cooperation with the detent system.

These and other advantages of the present invention will become apparent upon further reading of the specification.

BRIEF DESCRIPTION OF THE DRAWINGS

FIG. 3 is a perspective view of the interlock system of FIG. 1 showing the pivoting connection between the ski pole grip and the glove in broken lines;

FIG. 4 shows a natural grip position of the skier's hand about the ski pole grip;

FIG. 7 is a perspective view of a racing embodiment of the present invention in an open release position;

FIG. 8 is an exploded perspective view of the pole-side interlock structure of FIG. 7;

FIG. 9 is a perspective view of the invention of FIG. 7 in a closed lock position;

DETAILED DESCRIPTION OF THE ILLUSTRATIVE EMBODIMENTS

Figure 1:
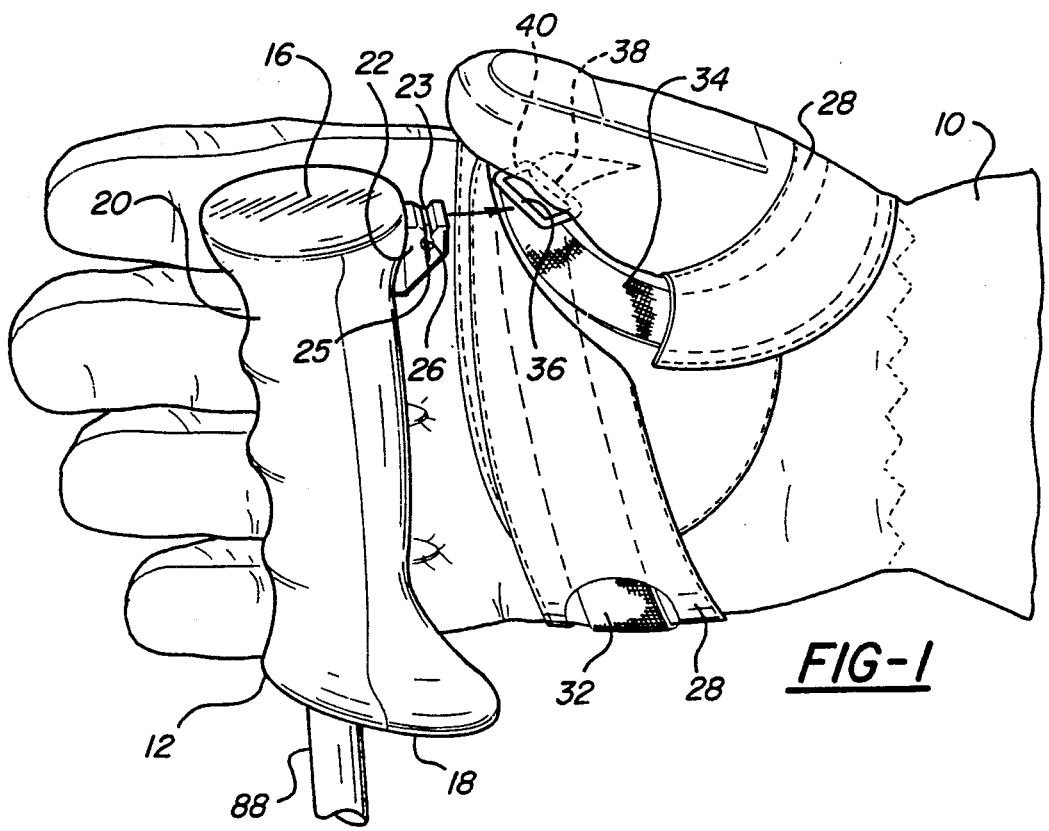
FIG. 1 is a perspective view of one embodiment of the glove/grip interlock system of the invention in which the ski pole grip is detached from the glove.

Referring now to FIG. 1, a ski glove 10 and ski pole grip 12 are shown embodying one version of the glove/grip interlock system of the present invention. Grip 12 has a top end 16, a bottom end 18, and a continuous side gripping surface 20 on which is mounted an essentially U-shaped clip 22. Clip 22 is mounted on the rear face of side surface 20 of the grip generally corresponding to the point on the grip engaged by the V of the thumb and forefinger of the skier's hand and glove. Clip 22 may be integrally molded with grip 12 itself, or fastened thereto adhesively, mechanically, or in any other suitable manner providing a strong connection between clip 22 and grip 12. Clip 22 can also be provided as an aftermarket add-on feature for ordinary poles.

By "V" of the thumb and forefinger of the skier's hand and glove, I generally refer to the intersection of thumb and forefinger or the point of the V at or near that intersection as indicated in the drawings.

In the illustrated embodiment the clip is molded from Zytel ®, the registered trade name for a nylon-type polymer having good rigidity and wear characteristics. It will be understood by those skilled in the art that other materials, for example different polymers or metal, can be used. Clip 22 is generally U-shaped with an upward opening channel 23 defined by beveled surfaces 24 opening into cylindrical transverse pivot channel 26. A narrow keyway or slot 25 extends downwardly a short distance from the lower surface of pivot channel 26 to enhance flexibility of the prongs of the U. Pivot channel 26 is transverse to the axis of ski pole shaft 14.

Glove 10 has sewn thereon strap retainer sleeves 28 extending across both the palm of the glove and around the base of the thumb substantially as shown. Retainer sleeves 28 slidingly secure palm strap 32 and thumb strap 34 to the glove. Straps 32 and 34 are looped through a wire loop or buckle 40, the straps being sewn, tacked or otherwise fastened to each other and connector bar portion 38 of the buckle to position and tension it relative to the glove, and to transmit force applied to the buckle to the palm/wrist and base thumb areas of the glove. As shown in the drawings, straps 32,34 fasten the buckle 40 in place on or immediately adjacent the apex of the V of the thumb and forefinger. Specifically, straps 32 and 34 diverge around connector bar 38 and are sewn together below the bar and to the glove above the bar to define a loop or pocket within which connector bar 38 is contained. In this manner, the buckle 40 is essentially maintained in position near the apex of the V between thumb and forefinger with strap tension in two directions. Although not absolutely rigid with respect to the glove, buckle 40 is held tightly enough to clearly establish a preferred swing angle as described below.

The straps 32,34 are preferably made of heavy nylon webbing, although other materials can be used as will be apparent to those skilled in the art. The width of the straps at the buckle are preferably approximately equal to the length of connector bar 38 to prevent sideways shifting of buckle 40 relative to the straps. While in the embodiment shown, the straps are fixed to the glove by sewing (FIG. 3), the straps can be provided with adjustment mechanisms to shorten or lengthen them as desired and thereby adjust the tension and positioning of buckle 40.

Buckle 40 is fastened to the glove by straps 32,34 such that lock bar portion 36 extends partway between the thumb and forefinger of the glove essentially in the plane of the V defined therebetween.

Figure 5:
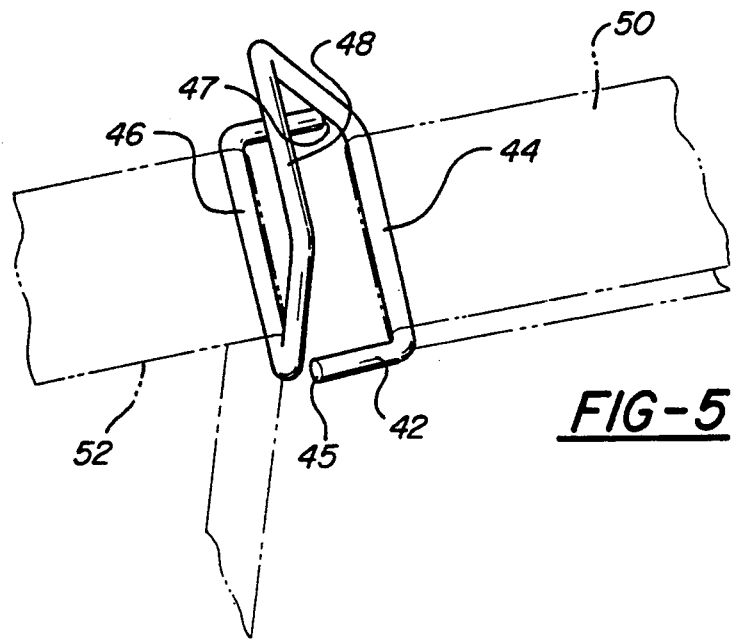
FIG. 5 is a perspective view of an alternate embodiment of the lock bar buckle of the present invention.
Figure 6:
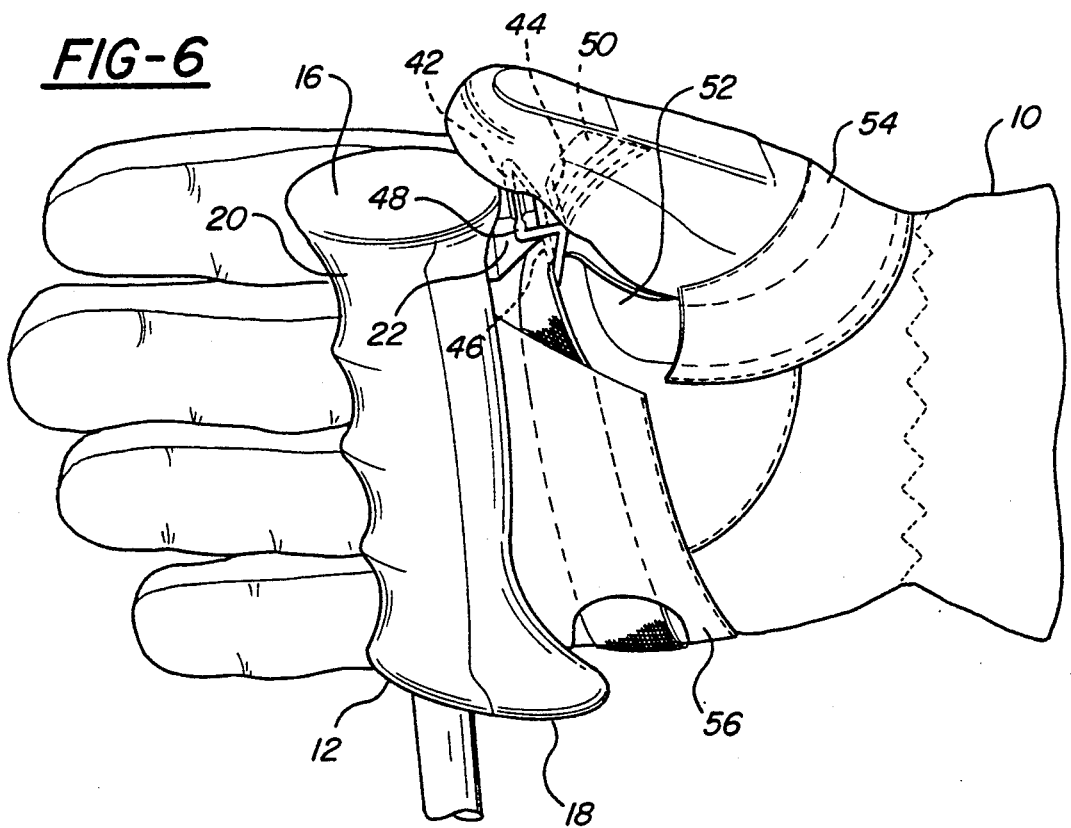
FIG. 6 is a perspective view of the lock bar buckle of FIG. 5 mounted on a glove in an alternate interlock system according to the present invention.

Referring now to FIGS. 5 and 6, an alternate embodiment of the glove strap and lock bar structure is shown. A "double loop" or three-bar buckle 42 comprises two connector bars 44,46 and a lock bar 48. Buckle 42, like buckle 40 in FIGS. 1-4, is preferably made from a single piece of stiff wire; e.g., approximately 0.090-inch diameter brass, although other materials and specifications can be used as will be apparent to those skilled in the art. Buckle 42 is formed from a single piece of wire bent into the roughly triangular shape shown with the ends preferably, although not necessarily, soldered or welded to the adjacent turns at 45 and 47.

The strap arrangement for fastening buckle 42 to glove 10 is slightly different than that shown in the embodiment of FIGS. 1-4. Referring to FIG. 6, a first strap 50 is looped about connector bar 44 and extends back over the intersection of the V between thumb and forefinger to the back of the glove, where it is fastened (not shown). A second strap 52 is looped about connector bar 46, with one end extending through sleeve 54 at the base of the thumb and the other end extending across the palm through sleeve 56, both ends of strap 52 meeting in the back of the glove where they can be adjustably fastened to one another or to the glove. The force exerted by strap 52 on connector bar 46 is substantially opposite to the force exerted by strap 50 connected to connector bar 44. These opposite tensioning forces serve to fix buckle 42 in place on the glove, near the intersection of the V between thumb and forefinger. Lock bar 48 is accordingly positioned between the thumb and forefinger substantially in the plane of the V in a fairly rigid manner sufficient to define a preferred swing angle.

Strap 50 can be of fixed length to simply delimit the lowermost position of buckle 42 relative to the glove, or may be adjustable to give the user more flexibility in customizing the position of buckle 42 on the glove. However, it should be understood that the preferred position is as near the intersection of the V as possible, so that the pivot point of the pole grip is substantially at the intersection of the V.

As with buckle 40, the lock bar 48 of buckle 42 can be made out of round in order to provide a release bias in certain rotational positions of the ski pole grip relative to the hand.

Referring now to FIGS. 7-9, a competitive or "racing" version of the interlock system invention is shown in which an unbreakable connection is formed between grip and glove. A substantially C-shaped clip 60 has a side-opening channel 62 formed therein to accept a lock bar 36,42 in a snap-fit essentially as described above in the embodiments of FIGS. 1-6. Clip 60 is integrally formed with rectangular extension bar 64 sized for a sliding friction-fit with mating passageway 66 on the side surface 20 of grip 12, extending at least part way therethrough. Clip 60 is slidingly movable between an open release position shown in FIG. 7, and a closed lock position shown in FIG. 9. As can be seen from the drawings, a lock bar 36,42 engaged in channel 62 cannot simply be pulled out of engagement with clip 60 when the clip is in the closed lock position abutting grip 12. Clip 60 must first be pulled out of engagement with grip 12 before the lock bar 36,42 can be released.

The sliding friction fit between extension bar 64 and passageway 66 in grip 12 is preferably very strong, requiring considerable effort to move clip 60 between the closed locked position and the open release position. While this friction force might be sufficient for most skiing situations to provide a locking connection between lock bar 36,42 and clip 60, for competition it is preferable to further strengthen the connection between clip 60 and grip 12 to positively lock it in the closed position. For this purpose, a keyway 68 is formed in extension bar 64 to be aligned with a vertical channel 70 extending down from top end 16 of grip 12 to passageway 66 in the closed lock position of clip 60. A bayonet-type pin element 72 with a position knob 74 formed at its top end is then inserted into channel 70 to engage circular portion 69 of keyway 68. Locking pin element 72 has a lower, rectangular cross-sectional area 73 whose narrower dimension mates with slot portion 67 of a keyway 68. Once pin element 72 and keyway 68 are engaged, knob 74 can be rotated in 90° increments to alternately align and misalign rectangular cross-section portion 73 of pin 72 with slot portion 67 of keyway 68. When portion 73 of pin element 72 and slot 67 of keyway 68 are aligned, clip 60 can be pulled outwardly from grip 12 a distance equal to the length of slot 67 to permit removal of lock bar 36,42 from clip 60. The engagement between pin 72 and keyway 68 prevents clip 60 from being fully disengaged from the grip unless pin 72 is first pulled out of grip 12 to disengage pin 72 from keyway 68.

The fit between pin 72 and vertical channel 70 is also preferably a tight sliding friction-fit to prevent inadvertent removal of pin 72.

Grip 12 and knob 74 may be provided with complementary reference marks to indicate to the user whether rectangular cross-section portion 73 of pin 72 is aligned or misaligned with slot 67 in the interior of the grip to permit partial withdrawal of clip 60.

In the illustrated embodiment, clip 60, extension bar 64 and pin element 72 are machined from aluminum, although it will be apparent to those skilled in the art that other materials may be used; e.g., other metals or polymers such as Zytel ®.

While clip 60 is shown in the illustrated embodiment as being axially slidable into and out of engagement with grip 12, it will be understood that other arrangements for putting clip 60 into a closed lock position are possible. Further, clip 60 could have a cylindrical extension bar and be rotatably movable into and out of engagement with the grip.

Figure 10:
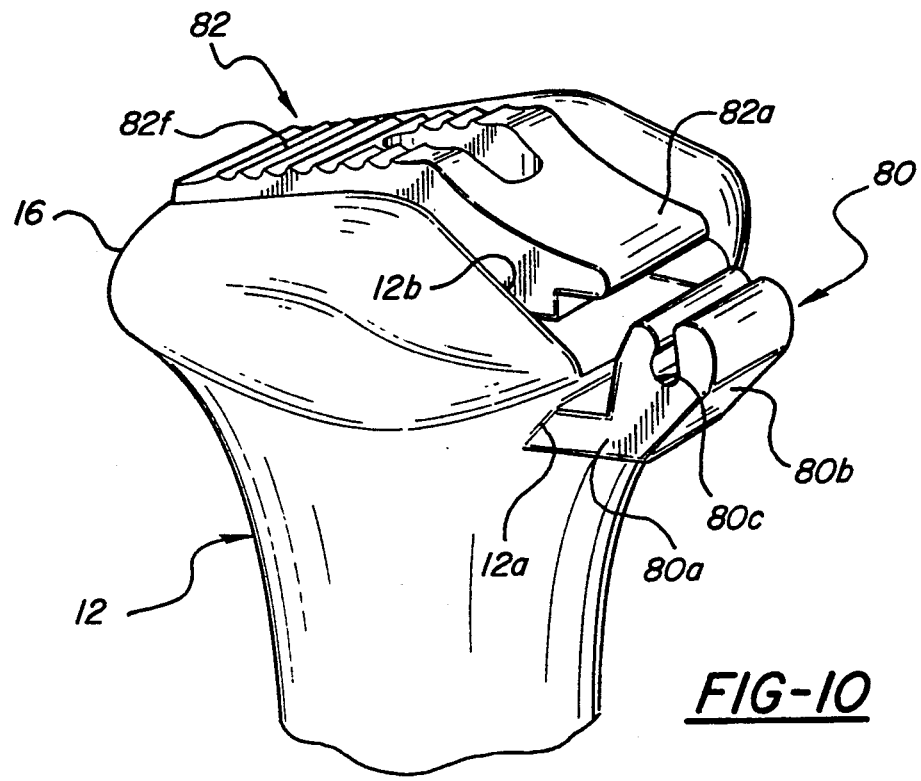
FIG. 10 is a perspective view of a further racing embodiment of the present invention.
Figure 11:
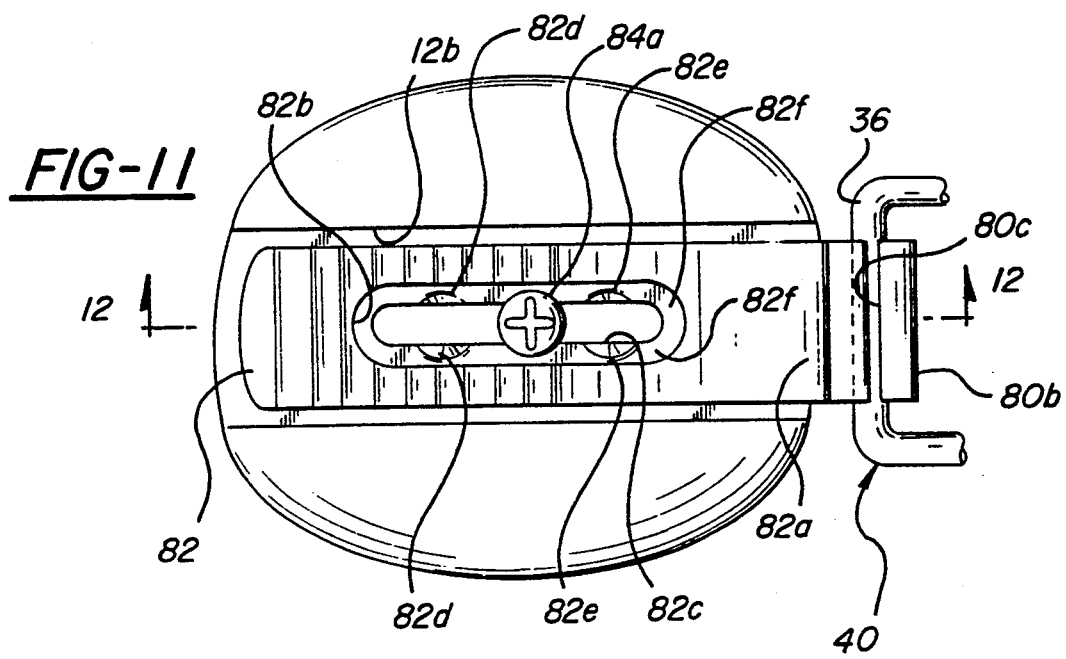
FIG. 11 is a top view of the embodiment of FIG. 10.
Figure 12:
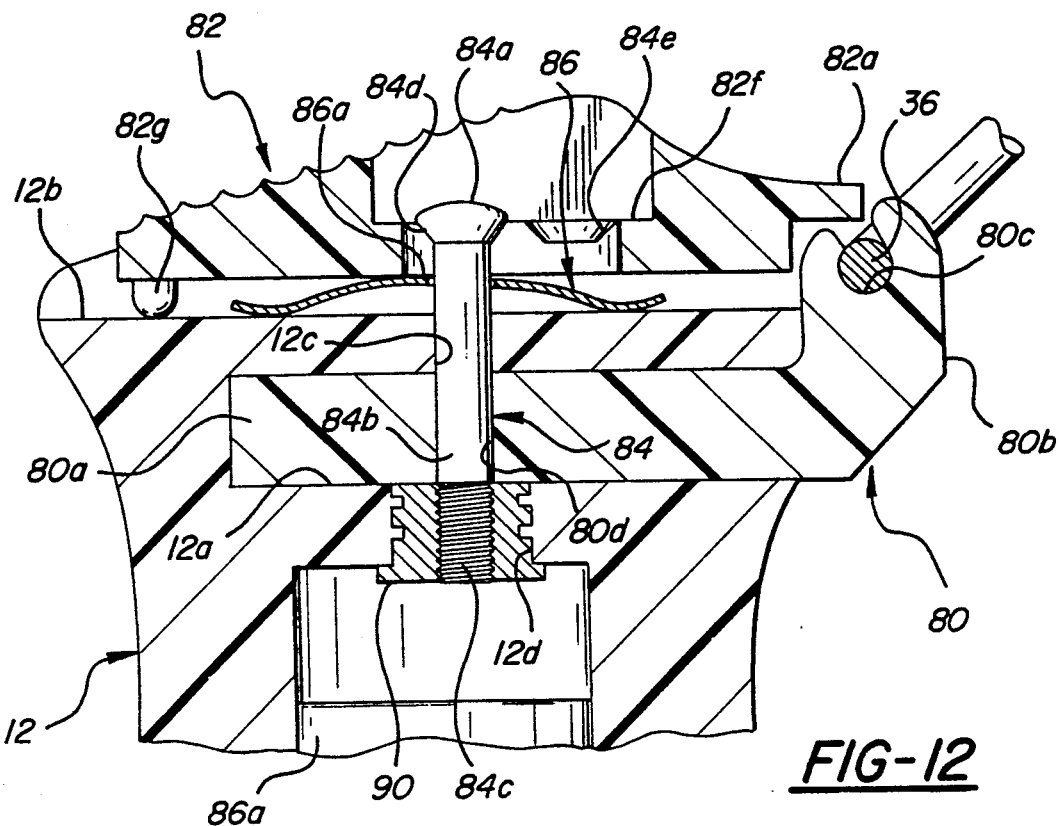
FIG. 12 is a cross sectional view taken on line 12—12 of FIG. 11.

The embodiment shown in FIGS. 10-12 is also a competitive or "racing" version of the interlock system in which special provision is made to ensure that the lock bar will not be inadvertently or accidentally pulled out of engagement with the clip.

The embodiment of FIGS. 10-12 includes a clip 80, a thumb slide 82, a screw bolt 84, and a leaf spring 86.

Clip 80 includes a main body or bar portion 80a received with a friction fit in a slot 12a in the grip 12 opening in the rear face of the grip and a clip portion 80b defining a generally U-shaped upwardly opening channel 80c designed to snappingly receive the lock bar 36 in the manner described with respect to the previous embodiments.

Slide 82 is mounted for reciprocal movement between locked and unlocked positions in an upwardly opening groove or slot 12b provided in the top end 16 of the grip. Groove 12b extends from the front to the rear of the grip and has a width slightly exceeding the width of the slide 82 so as to allow the slide 82 to move back and forth within the confines of the groove. The rearward end of slide 82 includes a locking tab portion 82a designed to move into locking relationship with respect to the lock bar 36 positioned within the clip so as to cover the opening in the clip and preclude inadvertent displacement of the lock bar from the clip. When the slide 82 is withdrawn relative to the clip the lock bar is exposed and may be withdrawn from the clip with suitable relative twisting movement between the lock bar and the clip. Slide 82 further includes an elongated upwardly opening slot 82b and a further elongated slot 82c positioned within slot 82b and extending between the bottom of slot 82b and the bottom of the slide. Slot 82b has a diameter slightly exceeding the diameter of the head 84a of the screw bolt 84 and slot 82c has a width slightly exceeding the diameter of the shaft 84b of the screw bolt 84.

Screw bolt 84 is positioned with its head 84a within slot 82b and with its shaft 84b extending downwardly through slot 82c, through a bore 12c in the grip, and through a bore 80d in the clip body portion 80a to position its lower threaded end 84c within a bore 12d in the grip core member. Bore 12 opens at its lower end in a central bore 12e which extends downwardly through the core member and opens at its lower end in the lower end of the core member where it may slidably and telescopically receive the upper end 88a of ski pole shaft 88.

Figure 13:
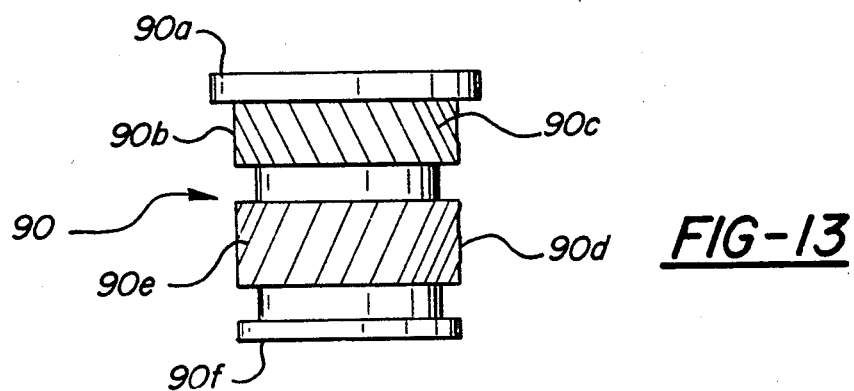
FIG. 13 is a detail view of a nut element employed in the embodiment of FIG. 10.

A nut element 90 is fixedly positioned within the bore 12d and threadably engages the lower end 84c of screw bolt 84. Nut element 90 is seen in detail in FIG. 13 and includes a head 90a, an annular portion 90b having teeth 90c skewed in one direction, an annular portion 90d having teeth 90e skewed in the opposite direction, and a lip portion 90f. Nut element 90 may comprise, for example, an element available from Heli-Coil Co. of Danbury, Conn. under the designation "Dodge Insert." Nut element 90 is positioned in bore 12d in an inverted disposition relative to the disposition illustrated in FIG. 13.

Leaf spring 86 is positioned in groove 12b in underlying relation to slide 82 and includes a central bore 86a passing the shaft portion 84b of screw bolt 84. Spring 86 acts to constantly bias the slide upwardly into engagement with the underface 84d of the screw bolt head 84a. As the slide is moved backwardly and forwardly between its locked and unlocked positions relative to the clip, the screw head 84a coacts with a first pair of detents 82d and a second pair of detents 82e to define detented locking and unlocking positions for the slide. Detent pairs 82d and 82e are defined as cut-out portions along opposite sides of slot 82c in the annular shoulder surface 82f between slots 82b and 82c. Leaf spring 86 acts to ensure that the head of the screw bolt is firmly positioned in the respective detent pair in either the locked or unlocked position of the slide and yields downwardly to allow the slide to move downwardly as it moves between its detented positions.

The slide is shown in its unlocked position in FIG. 10, in its locking position in FIG. 12, and in an intermediate position in FIG. 11. Slide 82 preferably includes serrations or ridges 82f on the top face of the slide to facilitate grasping of the slide by the thumb of the user and thereby facilitate movement of the slide between its locking and unlocking positions. Slide 82 further includes a protrusion 82g on the bottom of the slide proximate the forward end of the slide to guide the forward end of the slide in its sliding movement within groove 12b.

OPERATION

Figure 2:
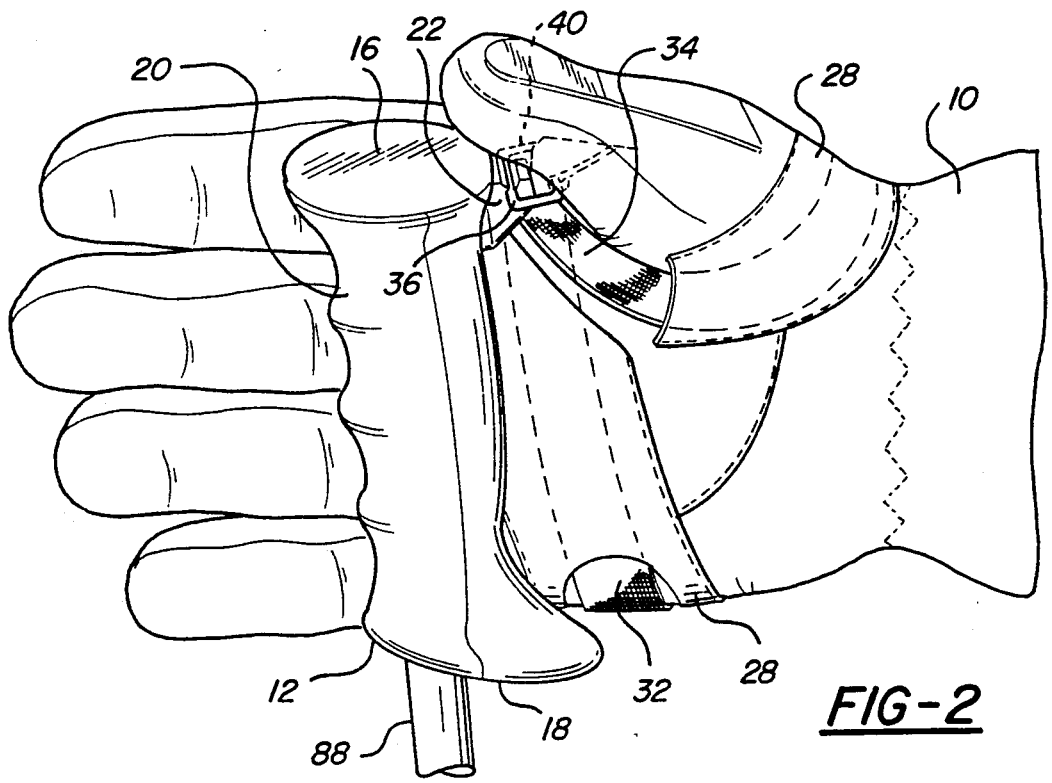
FIG. 2 is a view of the invention in FIG. 1 in which the ski pole grip has been attached to the glove with the interlock system.

Referring now to the embodiments of FIGS. 1-6, with buckle 40 or 42 securely fastened in place near the intersection of the V between thumb and forefinger, the skier simply aligns lock bar 36 or 48 with channel 23 and clip 22, and exerts downward pressure to snap the lock bar into transverse pivot channel 26 as best shown in FIGS. 1 and 2. As can be seen in the drawings, the relative positions of the lock bar and clip 22 connect grip 12 to glove 10 in a natural grasping position such that the skier simply has to close his or her hand for a proper grip without having to fumble for or "hike" grip 12 up into the proper position. This is perhaps best shown in FIGS. 2 and 4, where the top end 16 of grip 12 is maintained substantially at or slightly above the plane of the V between thumb and forefinger, while side surface 20 of grip 12 is maintained immediately adjacent the palm of the hand near the point of the V to allow the skier to reflexively grasp grip 12. This is especially important in competition, when timing is critical.

Referring now to FIG. 3, the pivot action between the lock bar and clip 22 allows the skier to pivot the pole outwardly for a pole touch while maintaining the proper position of grip 12 relative to the hand. Upon completion of the pole touch, the grip swings back into the natural grasping position shown in FIGS. 2 and 4, eliminating the possibility that the relaxation of the skier's grasp on the ski pole grip required for the pivot will result in a lost grip. The relatively rigid positioning of the buckle and lock bar relative to the glove, coupled with the transverse pivot axis of the clip about the rigid lock bar, sets a preferred swing angle in a plane essentially bisecting the V between thumb and forefinger. This ensures a natural, positive and precise swing or pivot requiring very little effort on the part of the skier.

To disengage the ski pole grip 12 from glove 10, the skier simply has to apply an upward pulling or twisting force to the glove, or a downward pulling force to the pole, to pop the lock bar out of clip 22. This serves as a safety feature should the ski pole become hooked on an object while the skier is still moving, for example on a chair lift or during a fall. This also eliminates twisting injuries to the hand and wrist by releasing the connection between glove and ski pole grip upon rotation of the grip in a plane perpendicular to the axis of the skier's arm, wrist and hand.

Because the release direction of the pole is downward with respect to the skier's hand, upward force applied to the pole while skiing actually serves to strengthen the connection between clip 22 and the lock bar 36,48.

In the embodiment of FIGS. 7-9, the skier inserts lock bar 36,42 into channel 62 of clip 60, slides the clip to the closed lock position abutting grip 12, and rotates pin element 72 approximately 90° to misalign portion 73 and slot 67 of keyway 68. The pole and glove are then securely locked together, and no force in any direction will disengage the two until the skier chooses to unlock them.

In the embodiment of FIGS. 10-13, the skier inserts the lock bar into the channel of the clip with the slide in the unlocked position and thereafter slides the slide rearwardly to the locking position in which the locked tab 82a of the slide precludes inadvertent displacement of the lock bar 36 from the clip. Because the slide moves at approximately right angles to the release direction of the glove side interlock structure from the pole side interlock structure, forces tending to separate the glove side interlock structure from the pole side interlock structure when the thumb slide is in the locked position actually strengthen the locked position of the thumb slide since such release forces are operating in the same direction as the spring bias which tends to hold the slide in one or other of the locked and unlocked positions in cooperation with the detent system.

It is to be understood that the embodiments illustrated above are preferred embodiments only, and are not intended to be limiting, as many forms and modification of the inventive interlock system lie within the scope of the appended claims.

For example, while the glove portion of the interlock system (retainer sleeves, straps, lock bar buckles) is illustrated as being integrally built into glove 10, it is within the scope of the invention to provide the glove portion of the interlock system as an aftermarket add-on for use with ordinary gloves.

While the preferred form of the glove portion of the interlock system provides adjustable positioning of the lock bar buckle relative to the hand via one or more adjustable straps, non-adjustable versions are possible. For example, the lock bar buckle could simply be sewn or otherwise built directly into the glove without the need for positioning and adjustment straps.

While the illustrated embodiments disclose the lock bar mounted on the glove and the clip mounted on the ski pole grip, this structure could be reversed and still provide the proper pivoting and swing action between ski pole grip and glove.

We claim:

1. In a ski glove/pole grip combination, the pole having a grip with top, bottom and side surfaces, an improved ski glove/grip interlock system comprising:
   first interlock means mounted on the ski pole grip;
   second interlock means on the ski glove for releasable engaging connection to the first means; and
   lock means on the ski pole grip associated with the first interlock means and selectively operable between a first position in which the second interlock means on the ski glove can be releasably engaged and disengaged with the first interlock means on the grip, and a second position in which the second interlock means on the glove cannot be disengaged from the interlock means on the grip, the lock means movable between the first and second positions in a first direction, the lock means locked into and released from the first and second positions in a second direction.

2. The apparatus as defined in claim 1, wherein the first interlock means comprise clip means having an opening to receive the second interlock means, the lock means substantially closing off the opening in the clip means when in the second position.

3. Apparatus as defined in claim 1, wherein the second interlock means is releasable from the first interlock means in a first direction, and the lock means on the ski pole grip is selectively movable between the first and second positions in a second direction that is non-parallel to the first direction.

4. Apparatus as defined in claim 3, wherein the second direction is substantially perpendicular to the first direction.

5. In a ski glove/ski pole grip combination, the pole having a grip with top, bottom and side surfaces, an improved ski glove/grip interlock system comprising:
   first interlock means mounted on the ski pole grip;
   second interlock means on the ski glove for releasable engaging connection to the first means; and
   lock means on the ski pole grip associated with the first interlock means and selectively operable between a first position in which the second interlock means on the ski glove can be releasably engaged and disengaged with the first interlock means on the grip, and a second position in which the second interlock means on the glove cannot be disengaged from the interlock means on the grip, the first interlock means comprising clip means having an opening to receive the second interlock means, the lock means substantially closing off the opening of the clip means when in the second position, the opening in the clip means opening upwardly, and the lock means axially slidable on the top surface of the ski pole grip to selectively cover the opening in the clip means.

6. In a ski glove/ski pole grip combination, the pole having a grip with top, bottom and side surfaces, an improved ski glove/grip interlock system comprising:
   first interlock means mounted on the ski pole grip;
   second interlock means on the ski glove for releasable engaging connection to the first means; wherein,
   the first interlock means includes lock means selectively operable between a first position in which the second interlock means on the ski glove can be releasably engaged and disengaged with the first interlock means on the grip, and a second position in which the second interlock means on the glove cannot be disengaged from the interlock means on the grip, the second interlock means releasable from the first interlock means in a first direction, the lock means on the ski pole grip selectively movable between the first and second positions in a second direction substantially perpendicular to the first direction, the lock means biased to the first and second positions by bias means acting essentially in the first direction.

7. In a ski glove/ski pole grip combination, the pole having a grip with top, bottom and side surfaces, an improved ski glove/grip interlock system comprising:
   first interlock means mounted on the ski pole grip, including an extension bar having a clip portion, the extension bar movable in and out of a slot on a rear side surface of the ski pole grip, the clip portion positioned on the rear side surface of the grip when the extension bar is inserted in the slot;
   second interlock means on the ski glove for releasable engaging connection to the clip portion of the first inerlock means;

axial locking means to selectively lock the extension bar and clip portion to the grip when the extension bar is inserted in the slot;

thumb slide lock means on the top surface of the ski pole grip, the thumb slide lock means slidable between first and second positions to selectively cover the clip portion;

the thumb slide lock means including detent means locking the thumb slide lock means in the first and second positions in a direction essentially perpendicular to the direction of motion of the thumb slide lock means between the first and second positions.

8. Apparatus as defined in claim 7, wherein the means for selectively locking the extension bar to the grip comprise a bolt element axially inserted through the top surface of the grip into the extension bar slot to engage the extension bar.

9. Apparatus as defined in claim 8, wherein the thumb slide lock means include a longitudinal slot through which the axial locking bolt is inserted, the slot including two spaced detent portions defining the first and second positions.

10. Apparatus as defined in claim 9, further including bias means biasing the thumb slide lock means upwardly relative to the grip.

11. In a ski glove/ski pole grip combination, the pole having a grip with top, bottom and side surfaces, an improved ski glove/grip interlock system comprising:

first interlock means mounted on the ski pole grip, comprising an upwardly-opening clip on a rear side surface of the grip at or below the level of the top surface of the grip;

a thumb slide on the top surface of the grip, the thumb slide movable in a plane of the top surface of the grip between a first open position disengaged from the clip, and a second closed position covering the clip;

second interlock means on the ski glove for releasable engaging connection with the upwardly-opening clip on the grip when the thumb slide is in the first open position;

a bias spring mounted between the top surface of the grip and the thumb slide, biasing the thumb slide upwardly essentially perpendicular to the direction of motion of the thumb slide between the first and second positions;

axial detents formed on the thumb slide, a slot extending between and connecting the detents, and an axial bolt extending through the slot and fastened to the grip, the bolt having a head portion which mates with the axial detents, the bias spring biasing the axial detents into engagement with the bolt head to lock the thumb slide in the first and second positions.

* * * * *

UNITED STATES PATENT AND TRADEMARK OFFICE
CERTIFICATE OF CORRECTION

PATENT NO. : 5,312,134
DATED      : May 17, 1994
INVENTOR(S): Goode et al.

It is certified that error appears in the above-indentified patent and that said Letters Patent is hereby corrected as shown below:

Column 2, line 49, delete "SUMMARY OF THE INVENTION".

Signed and Sealed this

Thirteenth Day of September, 1994

Attest:

BRUCE LEHMAN

*Attesting Officer*    *Commissioner of Patents and Trademarks*